United States Patent
Zeck et al.

(10) Patent No.: US 12,028,329 B2
(45) Date of Patent: *Jul. 2, 2024

(54) WORKFLOW SERVICE BACK END INTEGRATION

(71) Applicant: VMware LLC, Palo Alto, CA (US)

(72) Inventors: Daniel E. Zeck, Roswell, GA (US); David Shaw, Buford, GA (US); Robert Worsnop, Dunwoody, GA (US); John Ryan Bard, Smyrna, GA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/673,087

(22) Filed: Feb. 16, 2022

(65) Prior Publication Data

US 2022/0174057 A1 Jun. 2, 2022

Related U.S. Application Data

(63) Continuation of application No. 16/369,480, filed on Mar. 29, 2019, now Pat. No. 11,265,308.

(51) Int. Cl.
*H04L 9/40* (2022.01)

(52) U.S. Cl.
CPC ...... *H04L 63/0815* (2013.01); *H04L 63/0807* (2013.01); *H04L 63/102* (2013.01); *H04L 63/20* (2013.01)

(58) Field of Classification Search
CPC ............ H04L 63/0815; H04L 63/0807; H04L 63/102; H04L 63/20; H04L 67/02; H04W 12/068; H04W 12/72
See application file for complete search history.

(56) References Cited

U.S. PATENT DOCUMENTS

| | | | |
|---|---|---|---|
| 8,613,070 B1 | 12/2013 | Borzycki et al. | |
| 9,477,637 B1 | 10/2016 | Ward et al. | |
| 10,333,789 B1* | 6/2019 | Dippenaar | H04L 67/52 |
| 10,771,586 B1* | 9/2020 | Pratt | H04L 63/20 |
| 2006/0294247 A1* | 12/2006 | Hinckley | G06F 3/038 |
| | | | 709/228 |
| 2007/0277228 A1 | 11/2007 | Curtis et al. | |
| 2010/0043065 A1 | 2/2010 | Bray et al. | |

(Continued)

OTHER PUBLICATIONS

Joshi, DhavalJitendra, "Method and Apparatus for Navigation-Based authentication," Nov. 15, 2012, pp. 1-10 (Year: 2012).*

(Continued)

*Primary Examiner* — Luu T Pham
*Assistant Examiner* — Canh Le
(74) *Attorney, Agent, or Firm* — Kim & Stewart LLP

(57) ABSTRACT

Disclosed are various approaches for workflow service back end integration. In some examples, a command is transmitted causing a client device to present a workflow action to perform. A user command to perform the workflow action is identified using the client device. Authentication data including user credentials and a navigation action for a visual user interface is identified. The user credentials are transmitted to the network service and an emulation of the navigation action is performed. A command that performs the workflow action is transmitted to the network service.

17 Claims, 7 Drawing Sheets

(56) References Cited

U.S. PATENT DOCUMENTS

| | | | |
|---|---|---|---|
| 2010/0064218 A1* | 3/2010 | Bull | G06F 3/167 715/716 |
| 2010/0077469 A1 | 3/2010 | Furman et al. | |
| 2013/0019284 A1* | 1/2013 | Pacyga | H04W 12/084 726/4 |
| 2013/0019299 A1 | 1/2013 | Vepsäläinen et al. | |
| 2013/0275579 A1 | 10/2013 | Hernandez et al. | |
| 2014/0032486 A1* | 1/2014 | Sharma | G06F 16/335 726/19 |
| 2014/0033279 A1 | 1/2014 | Nimashakavi et al. | |
| 2014/0082715 A1 | 3/2014 | Grajek et al. | |
| 2014/0126016 A1 | 5/2014 | Namihira | |
| 2014/0173711 A1 | 6/2014 | Zlatarev | |
| 2015/0212675 A1 | 7/2015 | Firstenberg et al. | |
| 2015/0227725 A1 | 8/2015 | Grigg et al. | |
| 2016/0021097 A1 | 1/2016 | Shrotri | |
| 2016/0217062 A1 | 7/2016 | Singi et al. | |
| 2016/0313132 A1* | 10/2016 | Larroy | G01C 21/34 |
| 2017/0046127 A1* | 2/2017 | Fletcher | G06Q 10/06393 |
| 2017/0046321 A1* | 2/2017 | Biran | G06F 3/0488 |
| 2017/0185255 A1* | 6/2017 | Brunswig | G06Q 10/06311 |
| 2018/0075231 A1 | 3/2018 | Subramanian et al. | |
| 2018/0276053 A1 | 9/2018 | Kesavan et al. | |
| 2018/0300466 A1 | 10/2018 | Li | |
| 2019/0289010 A1 | 9/2019 | Yassour et al. | |
| 2019/0394187 A1 | 12/2019 | Fletcher et al. | |
| 2020/0042580 A1 | 2/2020 | Davis et al. | |
| 2020/0301678 A1* | 9/2020 | Burman | G06F 9/541 |
| 2021/0034431 A1 | 2/2021 | Bar Oz et al. | |

OTHER PUBLICATIONS

Trieu C. Chieu et al., "An Enterprise Electronic Contract Management System Based on Service-Oriented Architecture," pp. 1-8, 2007. (Year: 2007).*

Ping Lin et al., "Single Sign-On for Multiple Unified Communications Applications," pp. 110-116, 2012 (Year: 2012).*

Leo Pudhota; et al. "Services Integration Monitor For Collaborative Workflow Management" IEEE. 2005, pp. 1-6 (Year: 2005).

Victoria Beltran, "Characterization of web single sign-on protocols" IEEE, Jul. 2016, pp. 24-30 (Year: 2016).

* cited by examiner

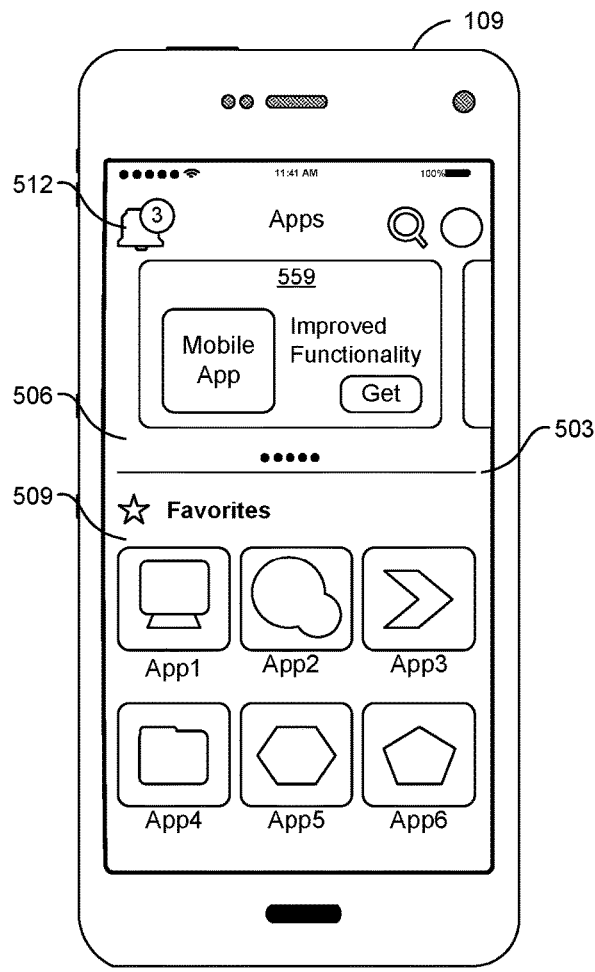
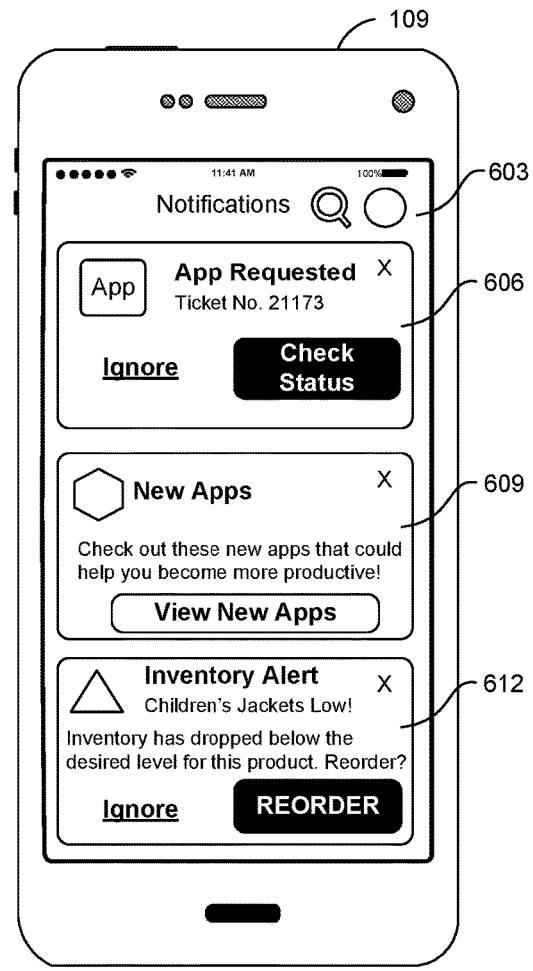
FIG. 5
FIG. 6

WORKFLOW SERVICE BACK END INTEGRATION

CROSS-REFERENCE TO RELATED APPLICATIONS

This application is a continuation of, and claims the benefit of and priority to, U.S. application Ser. No. 16/339,480, filed on Mar. 29, 2019, and entitled "WORKFLOW SERVICE BACK END INTEGRATION," the contents of which is incorporated herein by reference in its entirety. This Application is also related to U.S. application Ser. No. 16/369,492, entitled "Workflow Service Back End Integration," filed on Mar. 29, 2019, and U.S. application Ser. No. 16/369,498, entitled "Workflow Service Back End Integration," filed on Mar. 29, 2019. The aforementioned related patent applications are incorporated herein by reference in their entireties.

BACKGROUND

In an enterprise setting, individuals can utilize a number of different services and applications in order to complete tasks for an enterprise. These individuals can use authentication credentials to login to various applications or various services. Often times, these authentication credentials differ from service to service, even though they represent the same individual or group. For example, a user can rely on a cryptographic certificate to access one service, a username and password to access a second service, and a group or enterprise-wide credential to authenticate with a third service. In some cases, the enterprise can mandate that a particular service be used for a particular type of task.

However, the numerous services and authentication types can impede workflows performed by individuals, as the authentication process can be cumbersome. For example, individuals may struggle to recall the service that should be used for a particular task or the credentials for the service. While authentication can be cumbersome on any device, the process can be more difficult when attempting to perform a task or assignment using devices that are not designed for the authentication type utilized by a particular service. For example, authentication can pose problems for enterprise productivity when using mobile devices or voice activated devices. Individuals may not be apprised of tasks associated with a particular service until they log in to the service. Accordingly, traditional methods can be ineffective for accessing network services in an enterprise setting.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 5 is a drawing illustrating functionalities implemented by the workflow service and presented using a display of a client device.

FIG. 6 is a drawing illustrating functionalities implemented by the workflow service and presented using a display of a client device.

DETAILED DESCRIPTION

The present disclosure relates to workflow service back end integration. For example, a workflow service can manage enterprise workflows using network services and other enterprise back ends. This can include authentication with the network services and performing workflow actions. Multiple services and authentication types can be utilized by enterprise users. Users may struggle to recall the service that should be used for a particular task, or the credentials for the service. Users may not be apprised of tasks associated with a particular service until they log in to the service. Some devices may not be designed for the authentication type utilized by a particular service. Accordingly, traditional methods can be ineffective for accessing network services in an enterprise setting. However, the present disclosure describes a more effective solution to authenticate with network services for enterprise workflows.

Figure 1:
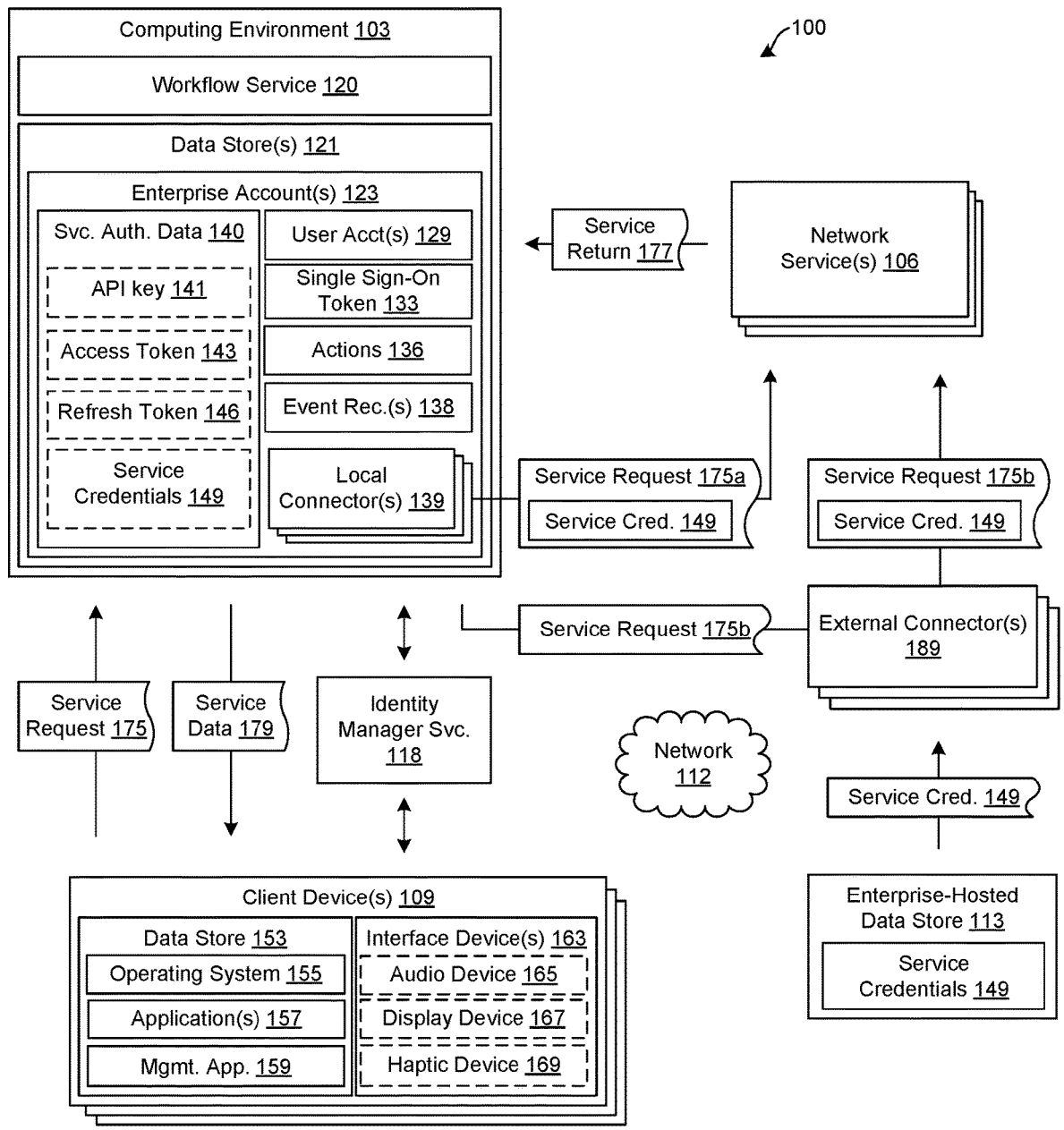
FIG. 1 is a drawing of an example of a networked environment, including client devices, network services, an identity manager service, a workflow service, and other components in communication through a network.

With reference to FIG. 1, shown is an example of a networked environment 100. The networked environment 100 can include a computing environment 103 executing a workflow service 120, network services 106, client devices 109, an enterprise-hosted data store 113, and external connectors 189 in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 executing the workflow service 120 can include a server computer or any other system providing computing capability. While referred to in the singular, the computing environment 103 can include a plurality of computing devices that are arranged in one or more server banks, computer banks, or other arrangements. The computing devices of the computing environment 103 can be located in a single installation or can be distributed among many different geographical locations local and/or remote from the other components. The computing environment 103 can include a grid computing resource or any other distributed computing arrangement. The computing environment 103 can also include or be operated as one or more virtualized computer instances. For purposes of convenience, the computing environment 103 is referred to herein in the singular. The components executed on the computing environment 103 can include a workflow service 120 as well as other applications, services, processes, systems, engines, or functionality not discussed in detail herein. The workflow service 120 can be stored in the data store 121 of the computing environment 103.

The workflow service 120 can be utilized by one or more enterprises. In some embodiments, the workflow service can be part of a local network, trusted network, or intranet, which can be separate from the other components of the networked environment 103. In some cases, the identity manager service 118 can be part of the computing environment 103. In other cases, the identity manager service 118 can be separate from the computing environment 103.

The workflow service 120 can manage enterprise workflows performed by users of the client devices 109. The workflow service 120 can also manage authentication with network services 106 that are utilized as backend services for the workflows. The workflow service 120 can monitor one or more network services 106 that a user is authorized to access. For example, the workflow service 120 can periodically query a network service 106 for notifications, updates, messages, changes, actions to be performed, or other events. If a notification, update, message, change, action to be performed, or other event is identified, the workflow service 120 can then notify the user. For example, the workflow service 120 can send a message to the client device 109 to notify the user. The operating system 155 of the client device 109 can include a notification framework that provides a notification for the message using the client device 109. The notification can include a sound generated using an audio device 165, a visual notification using a display device 167, and haptic feedback using a haptic device 169.

The workflow service 120 can include authentication functionality, which can include retrieving, caching or storing service authentication data 140 provided by various network services 106. The authentication data 140 can be used to query the network services 106 for information. In some embodiments, use of the workflow service 120 can be invisible to the user. In other embodiments, the user may be asked to opt-in to the use of authentication services of the workflow service 120 or the identity manager 118 through a web-portal or other user interface. Such a web-portal or other user interface can be provided, for example, by the workflow service 120 or the identity manager 118.

The data store 121 can include any storage device or medium that can contain, store, or maintain the instructions, logic, or applications described herein for use by or in connection with the computing environment 103. The data store 121 can be a hard drive or disk of a host, server computer, or any other system providing storage capability.

While referred to in the singular, the data store 121 can include a plurality of storage devices that are arranged in one or more hosts, server banks, computer banks, or other arrangements. The data store 121 can include any one of many physical media, such as magnetic, optical, or semiconductor media. More specific examples include solid-state drives or flash memory.

The data store 121 can include memory of the computing environment 103, mass storage resources of the computing environment 103, or any other storage resources on which data can be stored by the computing environment 103. The data stored in the data store 121 can include, for example, a number of enterprise accounts 123, each of which can be associated with user accounts 129, service authentication data 140, single sign-on tokens 133, actions 136, service records 138, and local connectors 139.

The user accounts 129 can be associated with specific subsets of the service authentication data 140, single sign-on tokens 133, actions 136, service records 138, local connectors 139, and external connectors 189. The data stored in the data store 121 can be associated with the operation of the various applications and/or functional entities described. A user account 129 includes information associated with a user. The information can include one or more authentication credentials, such as the single sign-on tokens 133, as well as stored or cached access tokens 143, refresh tokens 146, and service credentials 149. Other information about the user can also be stored as part of the user account 129, such as the user's name, email address, contact information, enterprise responsibilities, and client devices 109. The responsibilities can include responsibilities to perform particular actions 136 or types of actions 136 for the enterprise.

A user account 129 can also include access permissions that indicate computing resources that the user account is authorized to access. For example, the access permissions can indicate that a user account is permitted to access some network services 106 but is prohibited from accessing other network services 106. As another example, the access permissions can indicate that the user account 129 is allowed to access certain features of a network service 106, but prohibited from accessing other features. For example, if one of the network services 106 that a user was permitted to access was a customer relationship management (CRM) service, the user might have permission to access his or her own contacts but be prohibited from accessing the sales contacts of other users.

The user account 129 can identify device data for associated client devices 109. Device data can include one or more of a device identifier, a unique device identifier (UDID), a media access control (MAC) address, an internet protocol (IP) address, or another identifier that uniquely identifies a device with respect to other devices. The device data can include device specifications, and a type of each client device 109. Specifications for the client device 109 can include a hardware configuration that specifies a chipset identifier, a video card identifier, a memory identifier, a monitor or screen identifier, an input device identifier, and a peripheral identifier for each peripheral utilized by the client device 109. Specifications for the client device 109 can include a software configuration that specifies an application identifier for each application installed on the client device 109, a driver or driver version for hardware device and peripheral of the client device 109, an operating system or operating system version installed on the client device 109, and other information. The user account 129 can also include an organizational group of the user account 129 or the client device 109.

The single sign-on (SSO) token 133 is a software token generated by the identity manager 118 in response to a successful authentication of the user with the identity manager 118 using authentication credentials for the identity manager. The identity manager credentials can be user-specific. The identity manager credentials 133 represent the credentials that a user can present to the identity manager 118 to authenticate the user's identity. Identity manager credentials can include a combination of a username and password, a cryptographic certificate, a one-time password, or a combination of several of credentials as part of a multi-factor authentication schema. Examples of one-time passwords can include a one-time password generated using a version of the time-based one-time password algorithm (TOTP) or a one-time password generated using the HMAC-based one-time password (HOTP) algorithm.

The SSO token 133 can be used to provide the client device 106 access to various network services 106 on behalf of the authenticated user. The SSO token 133 can include a character string or other data. In some cases, the SSO token 133 can be provided in a request, a command, a response, a URL, a file, or another structure, and can be in XML format, JSON format, or another format. In some instances, such as those implementing a version of the KERBEROS protocol, a separate SSO token 133 can be generated for each network service 106 that the client device 106 attempts to access on behalf of the user. In other instances, the single SSO token 133 can be generated and used to provide the client device 106 with access to several of the network services 106. Although each of the network services 106 can have a different set of authentication credentials 133 linked to the user account 129, such as a different user name and password combination, the SSO token 133 allows the user to authenticate once with the identity manager 118 in order to use each of the network services 106 instead of having to authenticate with each of the network services 106 separately.

The identity manager 118 can authenticate users and manage user authorizations or permissions to access network services 106, applications, data, or other computing resources. For example, the identity manager 118 could correspond to a single sign-on portal that verifies a user's authentication credentials 133, issues a single sign-on token 133 that identifies the user, and verifies whether the user has the appropriate access permissions to access one or more network services 106. Examples of identity managers 118 include AMAZON's AWS Identity and Access Management (IAM) service, VMWARE's Identity Manager, or MICROSOFT's Active Directory Federation Services.

A network service 106 can be web application, web service, or other network facing application. The network service 106 can be federated or associated with a shared identity manager 118 so each can be accessed using the identity manager 118. One or more network services 106 can be provided by the same provider or by different providers. The network service 106 can receive a service request 175, and provide a service return 177 based on the service request 175. The workflow service 120 can generate a service request 175, or receive a service request 175 from a client device 109. The workflow service 120 can use a local connector 139 or an external connector 189 to provide the service request 175 to the network service 106.

The service authentication data 140 can include information that guides authentication with network services 106. For example, API keys 141, access tokens 143, refresh tokens 146, service credentials 149, cryptographic certificates and other credentials. The service authentication data 140 can also include network endpoints or addresses associated with particular functionalities provided by a network service 106. Service authentication data 140 can also include a process or a number of navigation actions or other actions that is required for the workflow service 120 to perform authentication with a network service 106 on behalf of a user.

The API key 141 can be a token provided by one of the network services 106 in response to a successful authentication with the network service 106. The API key 141 represents that a user account 129 is currently authorized to access or otherwise interact with the network service 106. The API key 141 can include a character string, code, or other data. The API key 141 can be provided to a network service 106 for authentication. For example, the API key 141 can be provided in an HTTP header, a URL query string parameter, a request body field, or another structure.

The access token 143 can be a token provided by one of the network services 106 in response to a successful authentication with the network service 106. The access token 143 represents that a user account 129 is currently authorized to access or otherwise interact with the network service 106. The access token 143 can include a character string, code, or other data. The access token 143 can be provided to a network service 106 for authentication. The access token 143 can be provided to a network service 106 for authentication. For example, the access token 143 can be provided in an HTTP header, a URL query string parameter, a request body field, or another structure. For security purposes, the access token 143 can have a time-limit associated with it, such as 1 hour, 3 hours, 6 hours, 8 hours, or some other period of time. Once the time-limit has expired, the access token 143 can no longer be used to prove current authentication status of the user account 129 with the network service 106. The access token 143 can be provided, for example, as part of an authentication exchange using a version of the OAUTH protocol.

The refresh token 146 can be a token provided by one of the network services 106 in response to a successful authentication with the network service 106. The refresh token 146 can be used to acquire a new access token 143 once a current or previous access token 143 expires. The refresh token 146 often has a much longer time-limit associated with it, such as 1 day, 1 week, 30 days, 3 months, or 1 year, which allows for the refresh token 146 to be used to acquire a series of access tokens 143 after an initial successful authentication. In the event that a user's access is revoked, the refresh token 146 can be marked invalid, preventing the refresh token 146 from being used to acquire new access tokens 143. The refresh token 146 can be provided, for example, as part of an authentication exchange using a version of the OAUTH protocol.

The workflow service 120 can submit an authentication request to the network service 106. Once authenticated, the network service 106 can provide credentials and other authentication data 140 to the workflow service 120. The workflow service 120 can store or cache the authentication data 140 to use on behalf of a user. If the authentication data 140 expires, or the workflow service 120 determines that an authentication using the authentication data 140 is unsuccessful, the workflow service 120 can attempt to obtain new credentials or new authentication data 140. For example, the workflow service 120 can automatically obtain a new access token 143 for the user when the current access token 143 expires or is about to expire. For example, the workflow service 120 can determine that the access token 143 was obtained 59 minutes ago, but is only valid for one hour. As another example, the workflow service 120 can determine that the access token 143 was obtained 61 minutes ago, but the access token 143 was only valid for one hour. In response to either example, workflow service 120 can submit a second authentication request to the network service 106. The second authentication request can include the refresh token 146.

The service credentials 149 can include a password, a token, a certificate, or another form of credentials. The service credentials 149 can be generated according to a security standard. The service credentials can be associated with a particular network service 106, or a particular function provided by the network service 106. Service credentials 149 can be considered a multi-user password, as multiple users or user accounts 129 can utilize the same service credentials 149 to access the network service 106. The service credentials 149 can also be group-wide credentials for use by a group of users, or enterprise-wide credentials for use by an entire enterprise. Group credentials, enterprise-wide credentials, or other multi-user credentials can also include a username and password, a cryptographic certificate, a character string, a one-time password, or a combination of several of credentials as part of a multi-factor authentication scheme.

The actions 136 can include tasks that are part of an enterprise workflow. For example, actions 136 can include scheduling a meeting, sending a product order, sending a message, adding a calendar item, requesting an application, requesting a client device 109, and other workflow actions. Some actions 136 can specify a responsible user account 129 that always performs the particular action 136. Other actions 136 can be performed by any user account 129. The actions 136 can also include a trigger condition that the workflow service 120 can identify in order to determine the actions 136 should be performed.

Each action 136 can also be performed by a particular network service 106. The workflow service 120 can provide a user interface through which an enterprise can associate a particular action with a particular network service 106. An enterprise can have access to a number of network services 106 that can handle a particular action. However, the enterprise can specify, through the network interface, that the particular network service 106 is to be utilized to perform the particular action 136.

The workflow service 120 can identify the trigger condition for an action 136 using an event record 138. The event record 138 can include events that are detected by the workflow service 120. The events can also include sensor readings from Internet-of-Things (IoT) devices, inventory counts, and messages. Messages can include messages received from client devices 109 or network services 106, such as email messages, messaging service messages, short message service (SMS) messages, calendar messages, commands, and requests.

Connectors can refer to services or components that can be configure to fetch information that enables a user to perform an action using a client device 109. In some cases the connectors can be provided using a virtual machine or another virtual resource. Connectors can include local connectors 139 hosted in the computing environment 103, or external connectors 189 hosted external to the computing environment 103. Connectors can handle communications with the network services 106. For example, a connector can fetch user-specific and action-specific information from network services 106.

For security purposes, an enterprise can desire to prevent the service credentials 149 or other multi-user credentials from being transmitted over the Internet or public networks, unless being passed to an authentication endpoint of the network service 106. The workflow service 120 can transmit service requests, or requests associated with network services 106, to the local connectors 139 and external connectors 189. Because the local connector 139 is hosted in the computing environment 103, the workflow service 120 can provide the local connector with a service request 175*a* that includes service credentials 149. However, because the external connector 189 is external to the computing environment 103, the workflow service 120 can transmit a service request 175*b* that does not include the service credentials 149. In some cases, the service request 175*b* can include instructions to obtain service credentials 149 from the enterprise-hosted data store 113. The external connector 189 can retrieve the service credentials 149, and fetch information from the network service 106.

The workflow service 120 can include an administrative console or user interface that enables a user to configure a connector to fetch data from a network service 106. The user interface can include a text box or other user interface elements through which connector specifications can be entered or otherwise configured. The connector can include a connector name, a public facing connector URL or connector network address, a network endpoint of the network service 106, and an authentication type for the network service 106. The authentication types can include username/password, OAUTH, SSO, and others. The workflow service 120 can determine whether a particular connector is a local connector 139 or an external connector 189 by analyzing the connector URL. For example, the connector address can indicate that the connector is a local connector 139 where the connector URL includes a reference to a localhost, or the connector address is identified as a local IP address. The connector address can indicate that the connector is an external connector 189 where the connector address is a remote IP address, the connector URL excludes reference to a localhost.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, a voice activated smart device, or any other device with like capability. The client device 109 can have an operating system that can perform functionalities and execute applications. The operating system 155 can be stored in a data store 145 that also includes applications 157, a client management application 159, and other data. The client device 109 can execute the client management application 159 to perform or access the functionality described for the workflow service 120. The client device 109 can be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine, a voice activated smart device, or a kiosk that is located in a particular location, or is not easily portable. The client device 109 can include user interface devices 163 that can be utilized to interact with users. The user interface devices 163 can include audio devices 165, display devices 167, and haptic devices 169.

The operating system 155 of the client device 109 can execute various client functionalities or client applications 157, such as a management application 159, a browser application, a voice interaction functionality, or another application. The operating system 155 and some applications 157 can access network content served up by the computing environment 103, or other servers and can present this information to a user through one or more of the user interface devices 163. For example, the client device 109 can render a user interface on a display, such as a liquid crystal display (LCD), organic light emitting diode (OLED) display, touch-screen display, or other type of display device. The client device 109 can also present audio information using the audio device 165, and can provide haptic or physical feedback using the haptic device 169.

Some applications 157 can include a browser or a dedicated application, and a user interface can include a network page, an application screen, or other interface. The client device 109 can also access web applications using the browser application. Further, other applications 157 can include device management applications, enterprise applications, social networking applications, word processors, spreadsheet applications, media player applications, or other applications. The client management application 159 can be an application that performs certain functions in concert with the workflow service 120. The client management application 159 can perform actions as directed by the workflow service 120, for instance, by checking in with the workflow service 120, retrieving a command from the command queue, and implementing the command as discussed above.

The enterprise-hosted data store 113 can be a memory or data store of a server computer or any other system providing computing capability. The enterprise-hosted data store 113 can include data stores that are within a local network of an enterprise, or a cloud computing resource accessible by enterprise users.

Figure 2:
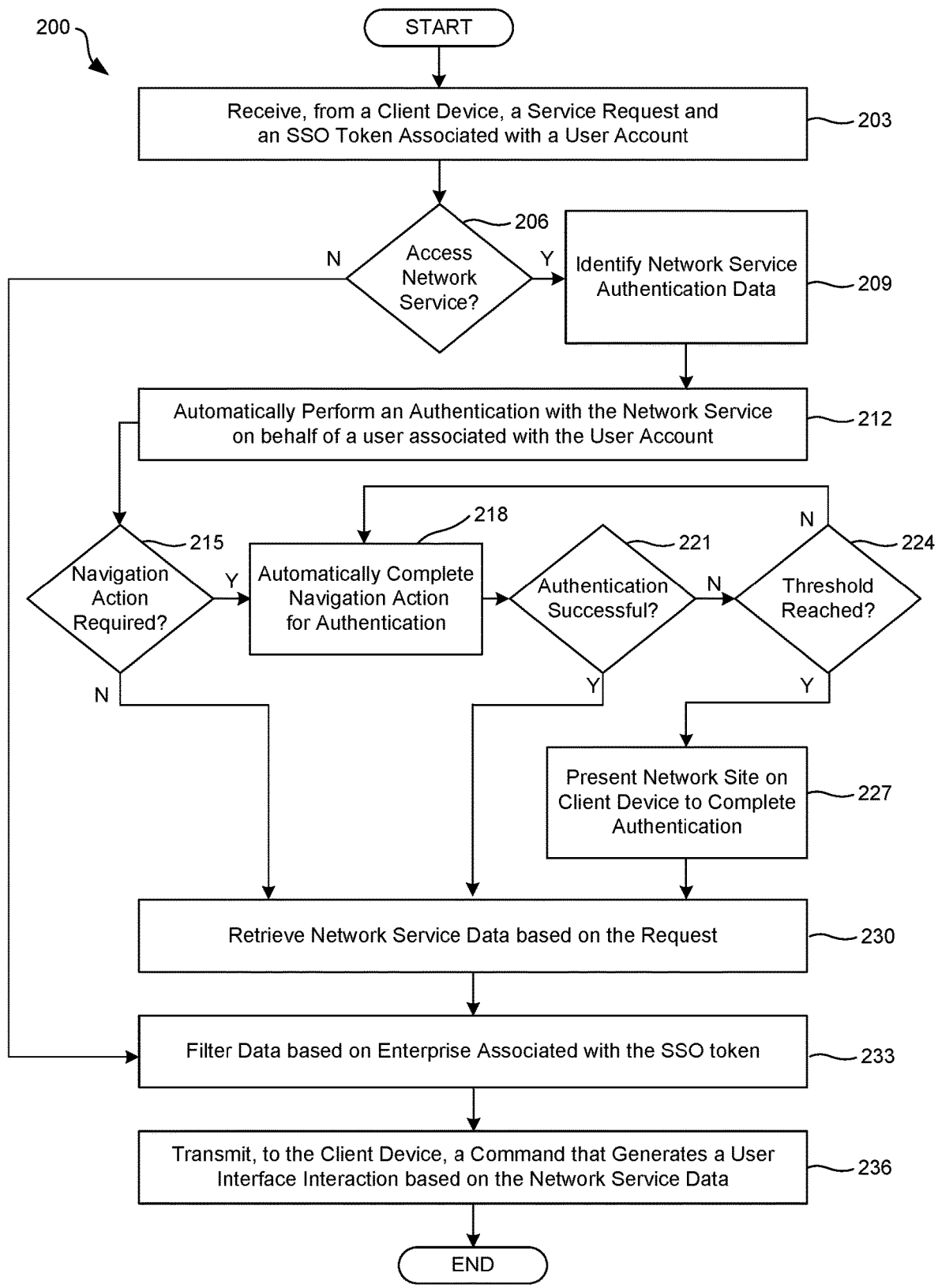
FIG. 2 is a flowchart outlining functionalities implemented by the workflow service and other components of the networked environment.

FIG. 2 shows an example flowchart 200 describing steps that can be performed by the components of the networked environment 100. Generally, the flowchart 200 describes how the workflow service 120 manages access to network services 106.

In step 203, the workflow service 120 can receive, from a client device 109, a service request 175 and an SSO token 133 associated with a user account 129. The service request 175 can include the SSO token 133. The service request 175 can be request for data associated with a network service 106. The service request 175 can also be a request to send data or a command to the network service 106. By way of example, the client device 109 can request inventory data 179 from an inventory service 106, expense data 179 from an expense service 106, conference data 179 from a conference service 106, or information technology (IT) service data 179 from an IT service 106. The service request 175 can also be a request for user data 179 as part of a person search of the user accounts 129.

In step 206, the workflow service 120 can determine whether a network service 106 is to be accessed. The workflow service 120 can include an event record 138, which can store a record of events for each enterprise account 123. The events can include service returns 177 from the network service 106. While FIG. 1 shows a service return 177 transmitted directly from the network service 106 to the workflow service 120, the service return 177 can also be relayed through the external connectors 189, client devices 109, or other intermediate devices. The events can also include a record of service requests 175 and messages that are transmitted from client devices 109 and received or detected by the workflow service 120.

In response to the service request 175, the workflow service 120 can determine that the requested data is already stored in the data store 121. The workflow service 120 can search the data store 121, and if the requested data is identified in the data store, the workflow service 120 can determine that the network service 106 need not be accessed. As indicated in step 233, the workflow service 120 can filter the data in the data store 121 based on an enterprise associated with the SSO token. This can permit the client device 109 to access data associated with the appropriate enterprise and can prevent the client device 109 from accessing data that is not associated with its associated enterprise account 123. While indicated below the decision block 206, the filtering step 233 can be performed while determining whether the network service 106 should be accessed.

In step 209, the workflow service 120 can identify network service authentication data 140. The workflow service 120 can identify the service authentication data 140 based on the SSO token 133 and the service request 175 itself. For example, the SSO token 133 can identify the user account 129. Based on the user account 129 and the SSO token 133, the workflow service 120 can identify a particular enterprise account 123. The enterprise account 123 can specify network services 106 to which the user account 129 has access. The workflow service 120 can identify the appropriate network service 106 based on a type of the service request 175. The type of service request 175 can be identified based on keywords, character strings, and other content of the service request 175. Where the service request 175 includes an identifier of the network service 106, the workflow service 120 can identify the appropriate network service 106 based on the service identifier.

The workflow service 120 can identify service authentication data 140 stored for the network service 106. Authentication data 140 can include credentials that are used for authentication with the network service 106 as well as an authentication process. The authentication process can identify an authentication endpoint or addresses for the network service 106. In some examples, where the workflow service 120 has successfully authenticated with the network service 106, a record of previous successful actions that successfully completed authentication can also be stored.

In step 212, the workflow service 120 can automatically perform an authentication with the network service on behalf of a user associated with the user account 129. Authentication can be difficult or inconvenient for users of the client devices 109. In order to improve user experience when performing workflows with the client device 109, the workflow service 120 can automatically handle authentication such that the process is invisible to the user. In some cases, the automatic authentications can include transmitting a request to a local connector 139 or an external connector 189 that handles requests and other communications with the network service 106. The workflow service 120 can submit an authentication request using an authentication endpoint of the network service 106. In some examples, an authentication request is transmitted to a URL or other network address. The authentication request can include credentials in a field or header of the request. The credentials can include an API key 141, access token 143, username and password combination, or service credentials 149.

In step 215, the workflow service 120 can determine whether a navigation action is required for authentication with the network service 106. A navigation action can include a selection of a user interface element of an authentication website of the network service 106. An identified authentication process can indicate that a particular navigation action was successful for a previous authentication with the network service 106. The workflow service 120 can determine that a navigation action is required based on the authentication process.

In other examples, the network service 106 uses a website for authentication, and workflow service 120 can automatically enter credentials through a user interface element of the authentication website. The workflow service 120 can detect or receive, from the network service 106, an indication that authentication is successful based on credentials submitted.

Alternatively, the workflow service 120 can attempt authentication using the credentials for the network service 106 and no indication of successful authentication is received. The workflow service 120 can then determine that a navigation action should be completed. The workflow service 120 can determine that the authentication website for the network service 106 includes a user interface element. For example, the workflow service 120 can parse markup language and other code of the authentication website to identify the user interface element. The code can include Hyper Text Markup Language (HTML), Extensible Markup Language (XML), Extensible HyperText Markup Language (XHTML), LaTex, Scribe, Javascript, and Hypertext Preprocessor (PHP), among others.

In step 218, the workflow service 120 can automatically complete the navigation action for authentication with the network service 106. The workflow service 120 can be configured to attempt navigation actions on the authentication website until authentication is successful. The workflow service 120 can streamline the user experience by attempting the navigation actions without presenting the website through the client device 109. The workflow service 120 can emulate the selection of an authentication user interface element and transmit results of the emulated selection to an identified endpoint of the network service 106 or website.

As indicated above, the workflow service 120 can identify a previously successful authentication process with the authentication site. The authentication process can indicate that a previous authentication was successful in response to a particular navigation action. To complete the navigation action, the workflow service 120 can automatically activate the particular button or user interface element.

The workflow service 120 can parse the website code to identify a navigation action such as an emulated selection of a user interface element. The user interface element can be the first user interface element, or the only user interface element on the authentication website. The workflow service 120 can also intelligently select the user interface element based on its position in the authentication website or association with a character string. The workflow service 120 can identify that a popup window is generated in response to the authentication request and can parse website code of the popup window to identify a button or selectable user interface element.

The workflow service 120 can determine that a popup window can be associated with authentication based on its association with the authentication request. The workflow service 120 can determine that the user interface element is associated with authentication based on a predetermined character string associated with the button in the website code, or within a threshold distance from the button on the authentication website. A predetermined set of character strings can be associated with authentication, such as "approve," "yes," "allow," "OK," and "authenticate." The workflow service 120 can also determine that the user interface element is at a prominent location, such as a threshold distance from a center of the authentication website, or a top of the authentication website. The workflow service 120 can also determine that the user interface element is within a particular section of the authentication website based on an HTML, tag or other code that indicates sections of the authentication website. Once the workflow service 120 identifies a navigation action and performs the navigation action, the workflow service can move to step 221.

In step 221, the workflow service 120 can determine whether authentication with the network service 106 is successful. In response to the proper navigation action or actions, the network service 106 can provide an indication that authentication is successfully completed. As indicated above, the workflow service 120 learn the appropriate navigation action by attempting navigation actions and identifying that authentication is successfully completed in response to the appropriate navigation action. If authentication is not successful, the workflow service 120 can move to step 224. If authentication is successful, the workflow service 120 can move to step 230.

In step 224, the workflow service 120 can determine whether a threshold number of navigation action attempts has been reached. Alternatively, the workflow service 120 can include a threshold time rather than a threshold number of navigation actions. If the threshold is not reached, the workflow service 120 can move to step 218 and identify a different action, and automatically complete the new action. If the workflow service 120 does not complete the appropriate navigation action within the threshold number of attempts or time limit, the user experience can suffer. Accordingly, once the threshold is reached, the workflow service 120 can move to step 227.

In step 227, the workflow service 120 can transmit, to the client device 109, a command to present a network site on the client device 109 to complete authentication. A user can complete the authentication, for example, by manually completing a navigation action, entering requested information, or performing other actions through a user interface of the network site.

In step 230, the workflow service 120 can retrieve network service data based on the request. For example, once the authentication is completed, the network service 106 can provide a service return 177 that includes service data 179. The workflow service 120 can save the service data 179 or a portion of the service data 179 in the service record or event record 138.

In step 233, the workflow service 120 can filter data based on an enterprise associated with the SSO token 133. The workflow service 120 can provide functionality for a number of tenants or enterprises, according to the enterprise accounts 123. Filtering the data based on SSO token 133 can prevent unauthorized access to service data.

In step 236, the workflow service 120 can transmit, to the client device 109, a command to generate a user interface interaction based on the service data 179. In some examples, the user interface interaction can include the service data 179. In other examples, the user interface interaction can include a notification that, when selected, provides access to the service data 179. The command can cause the client device 109 to present the user interface interaction through one or more of the user interface devices 163. For example, the command can update a user interface of an application 157 or operating system 155. The user interface can include an audio user interface, a visual user interface, or a multimedia user interface that incorporates one or more of the audio device 165, the display device 167, and the haptic device 169.

Figure 3:
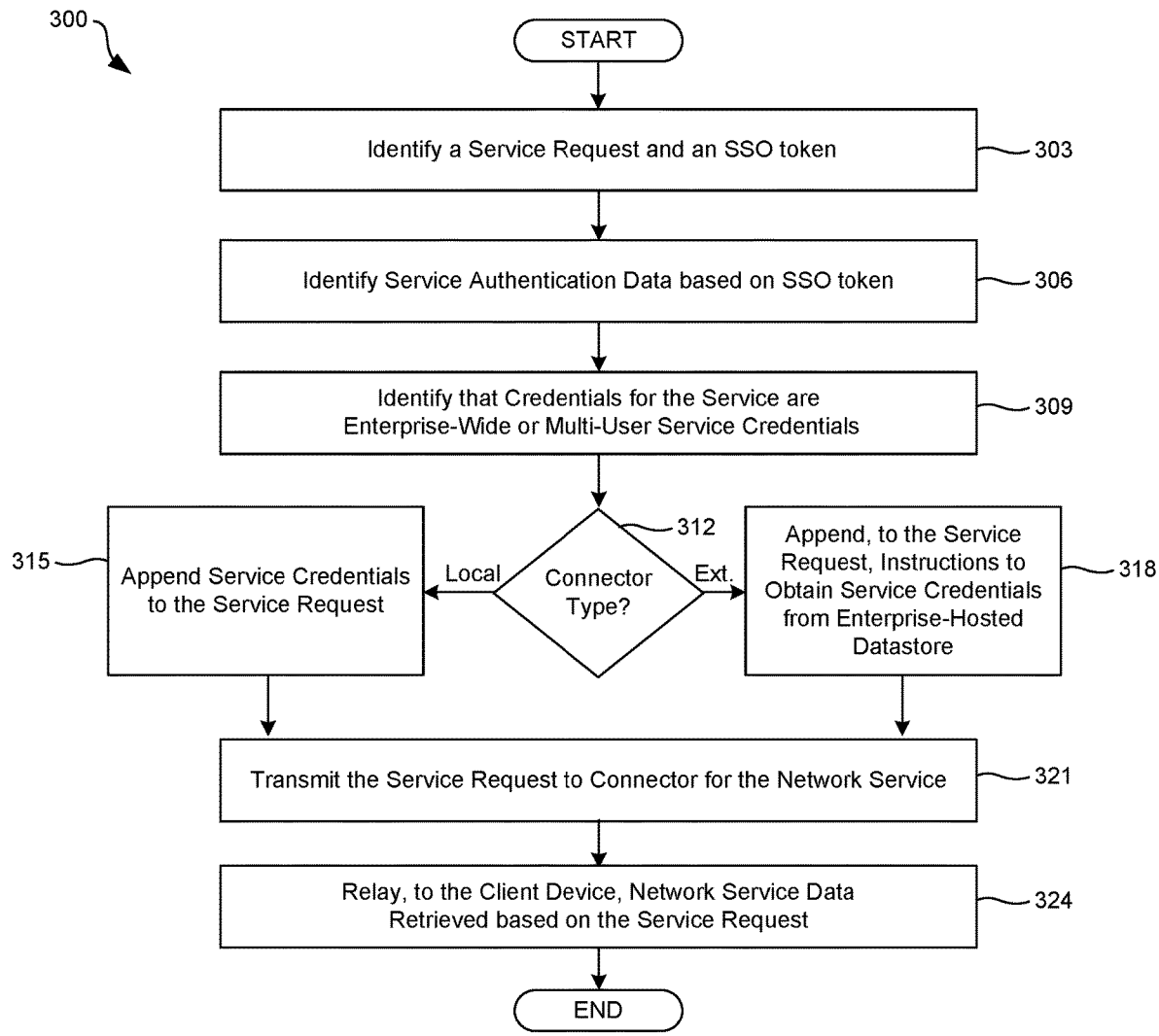
FIG. 3 is another flowchart outlining functionalities implemented by the workflow service and other components of the networked environment.

FIG. 3 shows an example flowchart 300 describing steps that can be performed by the workflow service 120. Generally, the flowchart 300 describes how the workflow service 120 can manage communications with local and external connectors to the network services 106.

In step 303, the workflow service 120 can receive a service request 175 and an SSO token 133 associated with a user account 129. The service request 175 can be a request for data associated with a network service 106. The service request 175 can also be a request to send data or a command to the network service 106. By way of example, the client device 109 can request inventory data 179 from an inventory service 106, expense data 179 from an expense service 106, conference data 179 from a conference service 106, or information technology (IT) service data 179 from an IT service 106.

In step 306, the workflow service 120 can identify service authentication data 140. The workflow service 120 can identify the service authentication data 140 based on the SSO token 133 and the service request 175. For example, the service request 175 can include an identifier of the network service 106, the workflow service 120 can identify the appropriate network service 106 based on the service identifier. The workflow service 120 can also identify the appropriate network service 106 based on a type of the service request 175. The type of service request 175 can be identified based on keywords, character strings, and other content of the service request 175.

The workflow service 120 can identify service authentication data 140 stored for the network service 106. Authentication data 140 can include credentials that are used for authentication with the network service 106 as well as an authentication process. The authentication process can identify an authentication endpoint or addresses for the network service 106. In some examples, where the workflow service 120 has successfully authenticated with the particular network service 106, a record of previous actions that successfully completed authentication can also be stored.

In step 309, the workflow service 120 can identify that are service credentials 149. Service credentials 149 can be considered a multi-user password or token, as multiple users or user accounts 129 can utilize the same service credentials 149 to access the network service 106. The service credentials 149 can also be group-wide credentials for use by a group of users, or enterprise-wide credentials for use by an entire enterprise. The workflow service 120 can determine that the credentials are service credentials 149 based on the authentication data 140. For example, the authentication data 140 can specify that the credentials for the network service 106 are service credentials 149 or should not be transmitted over the Internet or public networks. Alternatively, the authentication data 140 can include the service credentials 149, and the workflow service 120 can determine that they are service credentials 149 based on the format of the service credentials 149.

In step 312, the workflow service 120 can identify a connector type that is utilized for the network service 106. The connector type can be a local connector 139 or an external connector 189. If the connector is a local connector 139, the workflow service 120 can proceed to step 315. If the connector is an external connector 189, the workflow service 120 can proceed to step 318.

In step 315, the workflow service 120 can append the service credentials 149 to the service request 175. For example, the workflow service 120 can append an authentication header to the service request 175. The authentication header can include the service credentials 149.

In step 318, the workflow service 120 can append, to the service request 175, instructions to obtain service credentials 149 from the enterprise-hosted data store 113. For example, the workflow service 120 can append a header that includes the instructions to obtain service credentials 149 from the enterprise-hosted data store 113. The header can be considered an authentication header. In some cases, the instructions can include a network address of the enterprise-hosted data store 113. In other cases, the instructions specifies for the external connector 189 to obtain the service credentials 149, and the external connector 189 already includes the network address of the enterprise-hosted data store 113.

In step 321, the workflow service 120 can transmit the service request 175 to the local connector 139 or the external connector 189. The service request 175 can include the authentication header, which can include the service credentials 149 or instructions to obtain the service credentials 149. The local connector 139 can provide the service credentials 149 to the network service 106, and relay the service request 175. To streamline the user experience, the workflow service 120 can also automatically complete a navigation action as discussed above. The workflow service 120 can receive network service data 179 based on the request. The network service data 179 can be received from the network service 106 or relayed by the local connector 139.

The external connector 189 can obtain the service credentials 149 from an enterprise-hosted data store 113. In some cases, to increase security, the enterprise-hosted data store 113 and the external connector 189 can be hosted together on a local or trusted network. The external connector 189 can provide the service credentials 149 to the network service 106, and relay the service request 175. To streamline the user experience, the workflow service 120 can also automatically complete a navigation action. The workflow service 120 can receive network service data 179 based on the request. The network service data 179 can be received from the network service 106 or relayed by the external connector 189.

In step 324, the workflow service 120 can relay the network service data 179 to the client device 109. For example, the workflow service 120 can transmit, to the client device 109, a command to generate a user interface interaction based on the service data 179. The command can cause the client device 109 to present the user interface interaction through one or more of the user interface devices 163. For example, the command can update a user interface instructions of an application 157 or operating system 155. The user interface instructions can include an audio user interface, a visual user interface, or a multimedia user interface that incorporates more than one of the audio device 165, the display device 167, and the haptic device 169.

Figure 4:
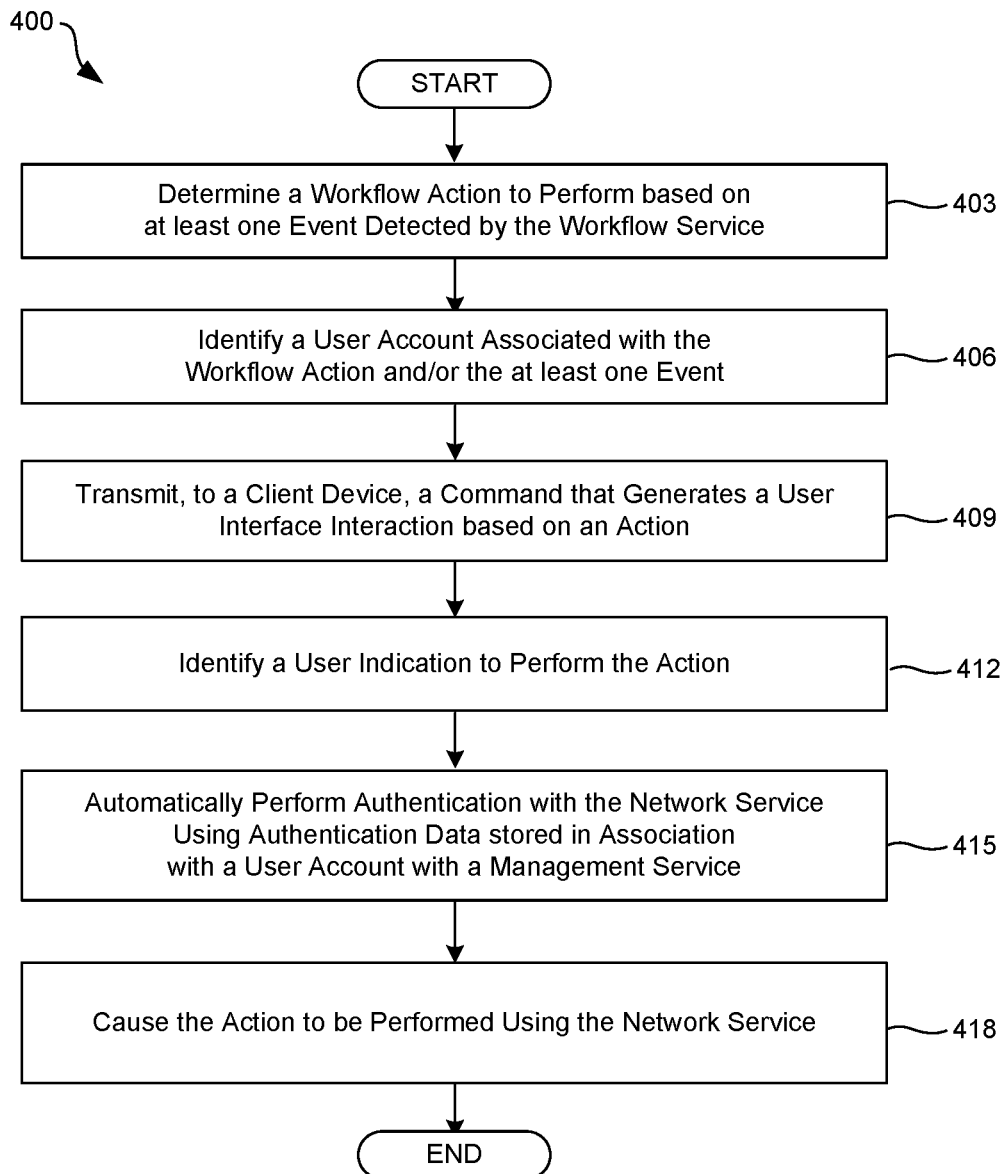
FIG. 4 is another flowchart outlining functionalities implemented by the workflow service and other components of the networked environment.

FIG. 4 shows an example flowchart 400 describing steps that can be performed by the workflow service 120. Generally, the flowchart 400 describes how the workflow service 120 can automatically identify actions in response to detected events or messages, notify a user, obtain a user directive, and perform the action using a network service 106.

In step 403, the workflow service 120 can determine a workflow action to perform based on at least one event detected by the workflow service 120. The events can include sensor readings from Internet-of-Things (IoT) devices, inventory counts, and messages. Messages can include messages received from client devices 109 or network services 106, such as email messages, messaging service messages, short message service (SMS) messages, calendar messages, commands, and requests. The workflow service 120 can maintain an event record 138. The workflow service 120 can include rules that define a trigger condition for an action 136. The workflow service 120 can identify the trigger condition for an action 136 using the event record 138.

The workflow service 120 can parse an event message to identify an action 136. The message can include a character string associated with a particular action. For example, a user can transmit a message to another user stating "Hey Danny Lead, let's set up a meeting." The workflow service can parse the message and identify the string "meeting" or "set up a meeting" is associated with a meeting event.

In step 406, the workflow service 120 can identify a user account associated with the action 136 and/or the at least one event. The actions 136 can include tasks that are part of an enterprise workflow. The actions can be considered workflow actions. Actions 136 can include scheduling a meeting, sending a product order, sending a message, adding a calendar item, requesting an application, requesting a client device 109, and other workflow actions. Some actions 136 can specify a responsible user account 129 that always performs the particular action 136. The workflow service 120 can determine that the action 136 is associated with a user account 129 that is responsible for the action 136.

However, some actions 136 can be performed by any user account 129. In these cases, the workflow service 120 can parse the event to identify a user identity included in the event. Following the example above, the workflow service 120 can identify that the string "Danny Lead" is a user identity associated with a particular user account 129.

The workflow service 120 can also identify a network service 106 associated with the action 136. An action 136 can be associated with a particular network service 106. An enterprise can specify that the particular network service 106 is to be utilized to perform the particular action 136. The workflow service 120 can search its data store 121 to identify the network service 106 that is associated with the identified action 136. Alternatively, the workflow service 120 can parse the message to identify a character string in the message that specifies a particular network service 106.

In step 409, the workflow service 120 can transmit, to a client device, a command that generates a user interface interaction based on the action 136. The command can cause the client device 109 to present the user interface interaction through one or more of the user interface devices 163. For example, the command can update a user interface of an application 157 or operating system 155. The user interface can include an audio user interface, a visual user interface, or a multimedia user interface that incorporates more than one of the audio device 165, the display device 167, and the haptic device 169.

In step 412, the workflow service 120 can identify a user indication to perform the action 136. The user indication to perform the action 136 can include a user selection of a user interface element. Alternatively, the user indication to perform the action 136 can include a voice command received through a microphone or audio recognition device of the client device 109.

In step 415, the workflow service 120 can automatically perform authentication with the network service 106 using service authentication data 140. The authentication can include performing authentication steps discussed above with respect to FIGS. 2 and 3.

In step 418, the workflow service 120 can cause the action to be performed using the network service 106. This process can enable authentication processes that can be difficult or impossible on certain client devices 109. The workflow service 120 can also enable a user to perform actions 136 through a voice command or selection of a single user interface element, rather than manually performing the action by logging in and interacting with the network service 106. While any client device 109 can benefit from the workflow service 120, the workflow service 120 can enable workflows inconvenient or impossible to perform using mobile devices, devices with a small display, and devices with no display.

FIG. 5 shows an example of a user interface 503 generated by an application 157 or management application 159 and rendered for display on a client device 109. The user interface 503 illustrates how commands transmitted by the workflow service 120 can be implemented using a display device 167 of a client device 109. The commands can include those discussed in step 236 of FIG. 2, step 324 of FIG. 3, and step 409 of FIG. 4.

The user interface 503 can include sections 506 and 509. A notification icon 512 can indicate a number of notifications received by the client device 109. The notifications can include those associated with an action 136 identified by the workflow service 120 or requested by the user. The section 509 can include a number of applications 157 that are installed or included in the client device 109.

The section 506 can include a number of cards, panels, or user interface elements associated with actions identified for the user by the workflow service 120 or requested by the user. For example, the user interface 503 can include a card or panel 559 that identifies an action 136. As shown in this example, the action 136 can include an installation of an application 157. The user interface panel 559 can present the a user with information that describes the application as including "Improved Functionality," and further describes the application using an icon or image associated with the application 157. In one example, the workflow service 120 can detect an event from a network service 106 indicating that the mobile application has been updated to include improved functionality. In response to the event, the workflow service 120 can transmit a command to update the user interface 503 with the panel 559. The user interface panel 559 can also include a user interface element that, when selected, causes the client device 109 to "GET" or install the application 157.

FIG. 6 shows an example of a user interface 603 generated by the application 157 or management application 159 and rendered on a client device 109. The user interface 603 can be generated in response to a selection of a notifications user interface element such as the notifications icon 512 of FIG. 5. The user interface 603 can include a card or panel 606, 609, and 612. The user interface 603 illustrates additional examples of how commands transmitted by the workflow service 120 can be implemented using a display device 167 of a client device 109.

The panel 606 can include information that describes an action 136. In this example, the action 136 can include checking a status of a request for an application. The information can include a ticket number and a description "App Requested." The panel 606 can also include a user interface element that, when selected, causes the client device 109 to check the status of a submitted application request ticket, and provide status information through the client device 109. The panel 606 can also include a user interface element that, when selected, causes the client device 109 to "Ignore" the action 136 and hide or remove the panel 606.

The panel 609 can include information that describes a "New Apps" action 136. The information can include a description "Check out these new apps that could help you become more productive." The panel 609 can also include a user interface element that, when selected, causes the client device 109 to provide further information about the new applications. For example, a selection of "View New Apps" can open a description of one or more of the applications in an app store.

The workflow service 120 can detect an event indicting that new applications are available. The workflow service 120 can identify that the client device 109 or user account 129 is associated with an older version of a new application, or another application that includes a functionality associated with the new application. The workflow service 120 can transmit, to the client device 109, a command that surfaces or otherwise provides the "New Apps" action 136.

The panel 612 can include information that describes an "Inventory Alert" action 136. The information can include a description "Children's Jackets Low! Inventory has dropped below the desired level for this product. Reorder?" The panel 612 can also include a user interface element that, when selected, causes a reorder action to be performed using the network service 106.

The workflow service 120 can detect an event indicting that inventory for the item, "Children's Jackets" is below a threshold level. The workflow service 120 can identify a reorder action, and that the user account 129 is responsible for a reorder action. The workflow service 120 can transmit, to the client device 109, a command that surfaces or otherwise provides a user interaction such as the panel 612 using a user interface device of the client device 109.

Once the "Reorder" user interface element is selected, the workflow service 120 can automatically perform a process that causes the reorder action to be performed using the network service 106. This can include automatically performing an authentication with the network service 106, for example, as described above regarding FIG. 4.

Figure 7:
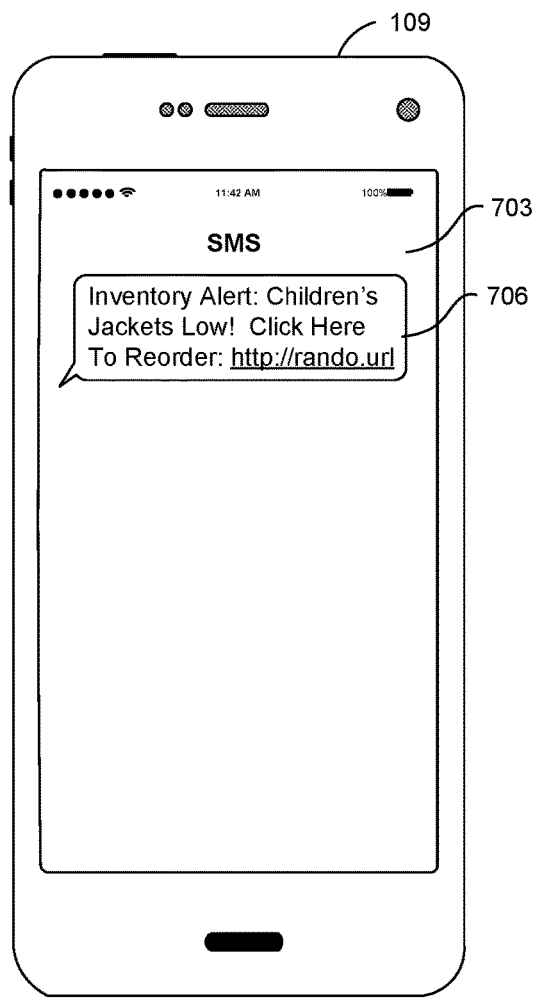
FIG. 7 is a drawing illustrating functionalities implemented by the workflow service and presented using a display of a client device.

FIG. 7 shows an example of a user interface 703 generated by an application 157 and rendered for display on a client device 109. The user interface 703 illustrates additional examples of how commands transmitted by the workflow service 120 can be implemented using a display device 167 of a client device 109. The application 157 can be an SMS messaging application, a messaging service application, or another application that includes messaging functionality. The user interface 703 can include a message 706. The message 706 can be transmitted by the workflow service 120 to the client device 109. The message 706 can include a description of the action and or the event. The message 706 can include a link such as a URL that, when selected, causes the workflow service 120 to automatically perform the reorder action 136 on behalf of the user.

The workflow service 120 can detect an event indicating that inventory for the item "Children's Jackets" is below a threshold level. The workflow service 120 can identify a reorder action and that the user account 129 is responsible for a reorder action. The workflow service 120 can transmit, to the client device 109, a command that surfaces or otherwise provides a user interaction such as the message 706.

Figure 8:
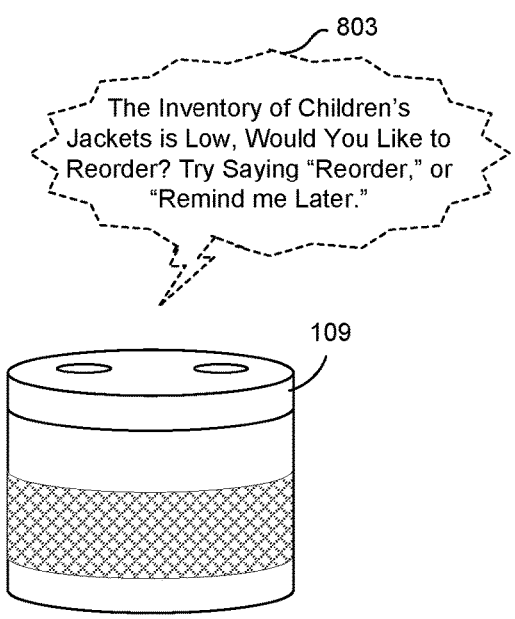
FIG. 8 is a drawing illustrating functionalities implemented by the workflow service and presented using an audio device of a client device.

FIG. 8 shows an example of an audio user interface or interaction 803 generated by an application 157, management application 159, or operating system 155 of a client device 109. The user interface 803 illustrates an example of how commands transmitted by the workflow service 120 can be implemented using an audio device 165 of the client device 109. The audio user interface 803 can include a description of the action or event, for example, "The Inventory of Children's Jackets is Low, Would You Like to Reorder?" The audio user interface 803 can also include a description of how to state a voice command that authorizes the action 136.

The workflow service 120 can detect an event indicting that inventory for the item, "Children's Jackets" is below a threshold level. The workflow service 120 can identify a reorder action, and that the user account 129 is responsible for a reorder action. The workflow service 120 can transmit, to the client device 109 associated with the user account 129, a command that surfaces or otherwise provides a user interaction such as the audio user interface 803.

Figure 9:
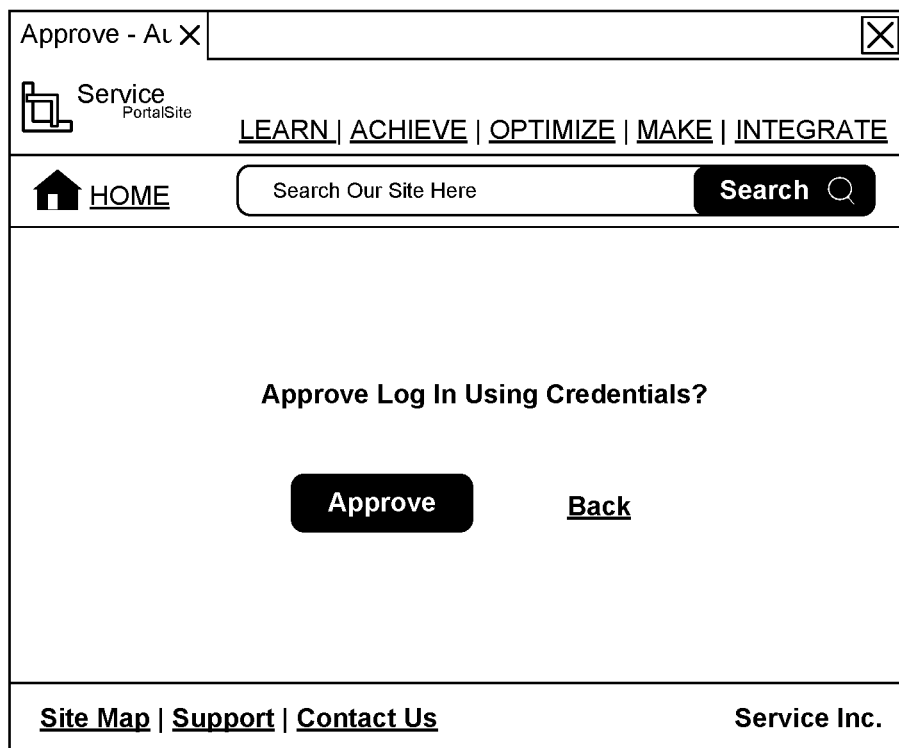
FIG. 9 is a drawing illustrating an example of an authentication site.

FIG. 9 shows an example of a user interface 903 of an authentication site of the service 106. The user interface 903 can include a user interface element 906 that is part of the authentication with the network service 106. The user interface element 906 can be provided for user authorization of authentication using certain credentials, or authorization of a type of authentication to be performed.

As discussed in step 218 of FIG. 2, the workflow service 120 can parse code of the website or network site to identify a navigation action such as an emulated selection of the user interface element 906. The user interface element 906 can be the first user interface element in the body of the website, or the only user interface element in the body of the website. The workflow service 120 can also intelligently select the user interface element 906 based on its position in the authentication website or association with a character string, such as "approve." The workflow service 120 can also determine that the user interface element 906 is at a prominent location, such as a threshold distance from a center of the website, or a center of the body of the website. The workflow service 120 can also determine that the user interface element 906 is within a particular section of the website based on an HTML tag or other website code. The user interface 903 can also include a number of other links, buttons, or other user interface elements. The workflow service 120 can attempt navigation actions that select user interface elements, until the user interface element 906 is selected, and authentication is successful.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by an application 157, workflow service 120, or another application can be rendered. In some examples, the user interface can be generated with user interface data provided by the computing environment 103. The client devices 109 can also include one or more input/output devices that can include, for example, a capacitive touchscreen or other type of touch input device, fingerprint reader, or keyboard.

Although the workflow service 120, client applications 157, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system. The computer-readable medium can include any one of many physical media, such as magnetic, optical, or semiconductor media. Examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system, comprising:
   a computing device comprising at least one processor and at least one memory; and
   machine-readable instructions stored in the at least one memory, wherein the instructions, when executed by the at least one processor, cause the computing device to at least:
   transmit, by a workflow service, a command for a client device to generate a user interface that presents a workflow action to perform, wherein a user command to perform the workflow action is identified using the client device;
   identify, by the workflow service, authentication data for a network service, the authentication data comprising user credentials and a user interface navigation action that is a part of an authentication process for a visual user interface of the network service, wherein the workflow service uses the authentication data to automatically perform the navigation action and complete the authentication process in an instance in which the client device is incapable of performing the authentication process;
   transmit, by the workflow service, the user credentials to the network service along with at least one command that performs an emulation of the user interface navigation action for the visual user interface to perform the authentication process, wherein the user interface navigation action comprises transmitting data that emulates selection of a user interface element on an authentication site of the network service; and
   transmit, by the workflow service to the network service, a command that performs the workflow action.

2. The system of claim 1, wherein the authentication data further comprises at least one of: an Application Programming Interface (API) key, an access token, a refresh token, and a cryptographic certificate.

3. The system of claim 1, wherein the authentication data further comprises a specification of a particular network endpoint associated with a functionality comprising the workflow action.

4. The system of claim 1, wherein the client device comprises a small display.

5. The system of claim 1, wherein the user interface that presents the workflow action provides a description of the workflow action.

6. The system of claim 1, wherein the client device is a mobile device that lacks a display.

7. A non-transitory computer-readable medium comprising machine-readable instructions, wherein the instructions, when executed by at least one processor, cause a computing device to at least:
- transmit, by a workflow service, a command for a client device to generate a user interface that presents a workflow action to perform, wherein a user command to perform the workflow action is identified using the client device;
- identify, by the workflow service, authentication data for a network service, the authentication data comprising user credentials and a user interface navigation action that is a part of an authentication process for a visual user interface of the network service, wherein the workflow service uses the authentication data to automatically perform the navigation action and complete the authentication process in an instance in which the client device is incapable of performing the authentication process;
- transmit, by the workflow service, the user credentials to the network service along with at least one command that performs an emulation of the user interface navigation action for the visual user interface to perform the authentication process, wherein the user interface navigation action comprises transmitting data that emulates selection of a user interface element on an authentication site of the network service; and
- transmit, by the workflow service to the network service, a command that performs the workflow action.

8. The non-transitory computer-readable medium of claim 7, wherein the authentication data further comprises at least one of: an Application Programming Interface (API) key, an access token, a refresh token, and a cryptographic certificate.

9. The non-transitory computer-readable medium of claim 7, wherein the authentication data further comprises a specification of a particular network endpoint associated with a functionality comprising the workflow action.

10. The non-transitory computer-readable medium of claim 7, wherein the client device comprises a small display.

11. The non-transitory computer-readable medium of claim 7, wherein the user interface that presents the workflow action provides a description of the workflow action.

12. The non-transitory computer-readable medium of claim 7, wherein the client device is a mobile device that lacks a display.

13. A method comprising:
- transmitting, by a workflow service, a command for a client device to generate a user interface that presents a workflow action to perform, wherein a user command to perform the workflow action is identified using the client device;
- identifying, by the workflow service, authentication data for a network service, the authentication data comprising user credentials and a user interface navigation action that is a part of an authentication process for a visual user interface of the network service, wherein the workflow service uses the authentication data to automatically perform the navigation action and complete the authentication process in an instance in which the client device is incapable of performing the authentication process;
- transmitting, by the workflow service, the user credentials to the network service along with at least one command that performs an emulation of the user interface navigation action for the visual user interface to perform the authentication process, wherein the user interface navigation action comprises transmitting data that emulates selection of a user interface element on an authentication site of the network service; and
- transmitting, by the workflow service to the network service, a command that performs the workflow action.

14. The method of claim 13, wherein the authentication data further comprises at least one of: an Application Programming Interface (API) key, an access token, a refresh token, and a cryptographic certificate.

15. The method of claim 13, wherein the authentication data further comprises a specification of a particular network endpoint associated with a functionality comprising the workflow action.

16. The method of claim 13, wherein the user interface that presents a workflow action is an audio user interface.

17. The method of claim 13, wherein the user interface that presents the workflow action provides a description of the workflow action.

* * * * *